(12) United States Patent
Fujimoto

(10) Patent No.: US 7,720,357 B2
(45) Date of Patent: May 18, 2010

(54) MULTIFUNCTIONAL RECORDING AND REPRODUCING APPARATUS

(75) Inventor: Shoujiro Fujimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1004 days.

(21) Appl. No.: 11/154,652

(22) Filed: Jun. 17, 2005

(65) Prior Publication Data

US 2005/0281533 A1 Dec. 22, 2005

(30) Foreign Application Priority Data

Jun. 18, 2004 (JP) .......................... P2004-181606

(51) Int. Cl.
*H04N 7/00* (2006.01)
*H04N 5/91* (2006.01)
(52) U.S. Cl. .............................. 386/95; 386/46; 386/68; 386/107; 386/108
(58) Field of Classification Search ................... 386/68, 386/95, 46, 107–108
See application file for complete search history.

(56) References Cited

U.S. PATENT DOCUMENTS

| 6,951,031 B2 * | 9/2005 | Hatano ........................ 725/50 |
| 2001/0005843 A1 * | 6/2001 | Tokashiki ..................... 707/1 |

FOREIGN PATENT DOCUMENTS

| JP | 8-96439 | 4/1996 |
| JP | 11-232727 | 8/1999 |
| JP | 11-285079 | * 10/1999 |
| JP | 2002-109870 | 4/2002 |
| JP | 2003-091902 | 3/2003 |
| WO | WO 02/28101 A1 | 4/2002 |

OTHER PUBLICATIONS

Translation of JP 11-285079, "Emergency Message Display Method in Mobile Telephone Set", Kofuji Noboru, Oct. 15, 1999.*

* cited by examiner

*Primary Examiner*—Thai Tran
*Assistant Examiner*—Daquan Zhao
(74) *Attorney, Agent, or Firm*—Morgan, Lewis & Bockius LLP

(57) ABSTRACT

A multifunctional recording and reproducing apparatus includes a first recording unit that records video signals on a first recording medium which can be ejected from a main body, a second recording unit that records the video signals on a second recording medium which can be ejected from the main body, and a programmed recording control unit that accepts setting of programmed recording. Whether a recording medium corresponding to a programmed recording item to be performed first among a plurality of programmed recording items set by the programmed recording control unit is the first recording medium or the second recording medium is displayed on a display unit.

7 Claims, 7 Drawing Sheets

MULTIFUNCTIONAL RECORDING AND REPRODUCING APPARATUS

BACKGROUND OF THE INVENTION

1. Field of the Invention

The present invention relates to a multifunctional recording and reproducing apparatus capable of performing programmed recording on different types of recording media, such as a videocassette tape and a DVD, and more particularly, to a multifunctional recording and reproducing apparatus capable of displaying a recording medium corresponding to a programmed recording item to be performed first and of selecting any one of different types of recording media as the subject of the programmed recording on a programmed recording setting screen.

2. Description of the Related Arts

When programmed recording is performed using a multifunctional recording and reproducing apparatus capable of performing recording on a videocassette tape (hereinafter, referred to as a videotape) and of recording on a DVD, programmed recording on the videotape and programmed recording on the DVD are performed using different display screens. That is, when programmed recording is performed on the videotape, an operation mode is set to a VCR mode in which the videotape is used. In addition, in the VCR mode, a programmed recording setting screen is displayed to input necessary information. In addition, when programmed recording is performed on the DVD, the operation mode is set to a DVD mode in which the DVD is used. In addition, in the DVD mode, a programmed recording setting screen is displayed to input necessary information (hereinafter, referred to as first related art).

In addition, in a waiting state until a programmed recording time after programmed recording is set using the above-mentioned method, the following display operation is performed. That is, it is assumed that the programmed recording on the videotape and the programmed recording on the DVD are set. In addition, it is assumed that the videotape is inserted and that a recordable DVD having a sufficient storage space is loaded. In this case, on a display unit using a fluorescent display tube (which is indicated by reference numeral 10 in FIG. 3), a clock mark 21 indicating that programmed recording is being executed is turned on. In addition, in order to show that the programmed recording on the videotape is set, a character display lamp 22 displaying characters 'VCR' that indicate the videotape is turned on. In addition, in order to show that the programmed recording on the DVD is set, a character display lamp 23 displaying characters 'DVD' that indicate the DVD are turned on.

Meanwhile, in a state in which programmed recording on both the videotape and the DVD is set, when the videotape is inserted, but the DVD is not loaded, the programmed recording on the videotape can be performed, but the programmed recording on the DVD cannot be performed. Therefore, the character display lamp 22 displaying the characters 'VCR' corresponding to the videotape is turned on, but the character display lamp 23 displaying the characters 'DVD' corresponding to the DVD flickers. In addition, the clock mark 11 also flickers. That is, since the DVD is not loaded regardless of whether the programmed recording on the DVD is set, a message that the programmed recording on the DVD cannot be performed is displayed on the display unit 10. In addition, when the DVD is loaded and the videotape is not inserted, the clock mark 11 and the character display lamp 22 displaying the characters 'VCR' flicker, and the character display lamp 23 displaying the characters 'DVD' is turned on (hereinafter, referred to as second related art).

In addition, for a multifunctional recording and reproducing apparatus capable of using both the videotape and the DVD, the following technology has been suggested (hereinafter, referred to as the third related art). That is, when a power supply is turned on so that the DVD starts to rotate, the rotation of the DVD is unstable for five seconds after the rotation of the DVD is started, resulting in strong vibration. Therefore, when recording is performed on the videotape in this period, scattering occurs in signals recorded on a control track. In addition, during reproduction, screen shaking is generated. For this reason, according to the third related art, even if programmed recording is performed on the videotape immediately after the power supply is turned on, the programmed recording is not performed for five minutes after the power supply is turned on, and then starts being performed after five seconds has been elapsed (for example, see JP-A-2003-91902).

SUMMARY OF THE INVENTION

However, when the first related art is used, the following problem arises. That is, in a case in which it is constructed such that a user can recognize programmed states of both the programmed recording using the video tape as a recording medium and the programmed recording using the DVD as a recording medium, in one of a VCR mode and a DVD mode, it is necessary that, after a screen for programmed recording is displayed, the recoding mode be switched to the other mode and then the screen of programmed recording be displayed. For this reason, operations for confirming the programmed recording are complicated. In addition, in a case in which a program to be recorded on the videotape by programmed recording is recorded on the DVD, since it is necessary that programmed recording be set using a screen for programmed recording displayed in the DVD mode after programmed recording is cancelled using a screen for programmed recording displayed in the VCR mode, the operation becomes complicated.

In addition, when the second related art is used, the following problem arises. That is, in the second related art, when the DVD is not loaded regardless of whether the programmed recording screen using the videotape as a recording medium and the programmed recording screen using the DVD as a recording medium are set, by flickering the clock mark 11 and the character display lamp 23 displaying the characters 'DVD' that indicates the DVD, a message that the programmed recording using the DVD as a recording medium cannot be performed is displayed. Such display is performed in the same manner even when it is set that, for example, the programmed recording using the videotape as a recording medium is performed tonight and that the programmed recording using the DVD as a recording medium is performed at night after ten days. Specifically, even when it is unnecessary that the DVD be rapidly loaded, the clock mark 11 and the character display lamp 23 displaying the characters 'DVD' flicker. Therefore, in a case in which the clock mark 11 and the character display lamp 23 displaying the characters 'DVD' flicker, it is difficult for a user to determine whether it is preferable to load the DVD or whether it is necessary to immediately load the DVD, when there is an opportunity to turn on the power supply.

The third related art prevents the vibration generated when the DVD is driven from having a bad influence upon signals recorded on the videotape. Therefore, it is difficult to solve the problems of the first related art and the second related art using the third related art.

According to one aspect of the invention, there is provided with a multifunctional recording and reproducing apparatus capable of making a user recognize which recording medium video signals are recorded on in programmed recording to be performed first, of preventing urging the user to load a recording medium at a predetermined position when it is not necessary that the recording medium be rapidly loaded at the predetermined position even though the recording medium corresponding to the programmed recording is not loaded at the predetermined position, of making the user recognize that an unsuitable recording medium is set and that the recording medium set for programmed recording has an insufficient storage space, of making the user recognize a recording mode when the storage space is insufficient, and of performing programmed recording on a recording medium not corresponding to the programmed recording when the recording medium corresponding to the programmed recording is not loaded at the predetermined position.

According to another aspect of the present invention, there is provided with a multifunctional recording and reproducing apparatus capable of displaying on a display unit whether a recording medium corresponding to the programmed recording to be performed first is a first recording medium or a second recording medium when a programmed recording mode for recording video signals on the first recording medium and a programmed recording mode for recording the video signals on the second recording medium are set, and of making a user recognize which recording medium the video signals are recorded in the programmed recording to be performed first.

According to another aspect of the present invention, there is provided with a multifunctional recording and reproducing apparatus in which, when a recording medium corresponding to the programmed recording to be performed first does not exist, a message that the programmed recording cannot be performed is displayed, but when the recording medium corresponding to the programmed recording is loaded at a predetermined position, even though a recording medium corresponding to another programmed recording does not exist, displaying a message that the programmed recording cannot be performed is stopped, and in which, even though the recording medium corresponding to the programmed recording is not loaded at the predetermined position, when it is not necessary that the recording medium be rapidly loaded at the predetermined position, it is prevented that the user loads the recording medium at the predetermined position rapidly.

According to another aspect of the present invention, there is provided with a multifunctional recording and reproducing apparatus in which, even if a recording medium corresponding to the programmed recording to be performed first is loaded at a predetermined position, when video signals cannot be recorded on the recording medium, a message that the programmed recording cannot be performed is displayed on a display unit, and a user can recognize that an unsuitable recording medium is set.

According to another aspect of the present invention, there is provided with a multifunctional recording and reproducing apparatus in which a user can recognize that a recording medium set for programmed recording has an insufficient storage space.

According to another aspect of the present invention, there is provided with a multifunctional recording and reproducing apparatus in which a user can recognize a recording mode when a storage space is insufficient.

According to another aspect of the present invention, there is provided with a multifunctional recording and reproducing apparatus in which one of two types of recording media can be selected on one setting screen as a recording medium for programmed recording, which makes it possible to easily replace and confirm the recording medium used for programmed recording.

According to another aspect of the present invention, there is provided with a multifunctional recording and reproducing apparatus capable of automatically switching a recording mode, serving as a selection to correspond to a selected recording medium, and of easily selecting the recording mode.

According to another aspect of the present invention, there is provided with a multifunctional recording and reproducing apparatus in which, when a plurality of programmed recording items is set, a programmed recording item to be performed first is displayed so as to be distinguished from the other programmed recording items, so that a user can recognize the programmed recording item to be performed first.

According to another aspect of the present invention, there is provided with a multifunctional recording and reproducing apparatus including a video recorder that records video signals on a videotape; a DVD recorder that records the video signals on a DVD; a programmed recording control unit that accepts setting of a programmed recording mode for recording the video signals on the videotape and setting of a programmed recording mode for recording the video signals on the DVD; and a display unit that is provided on a main body. In the multifunctional recording and reproducing apparatus, a message indicating whether a recording medium corresponding to a programmed recording item to be performed first among a plurality of programmed recording items set by the programmed recording control unit is the videotape or the DVD is displayed on the display unit. When the recording medium corresponding to the programmed recording item to be performed first is not loaded at a predetermined position, a message indicating that the programmed recording cannot be performed is displayed on the display unit. When the recording medium corresponding to the programmed recording item to be performed first is loaded at the predetermined position, the message that the programmed recording cannot be performed is not displayed on the display unit although a recording medium corresponding to another programmed recording item different from the programmed recording item to be performed first is not loaded at a predetermined position. Even if the recording medium corresponding to the programmed recording item to be performed first is loaded at the predetermined position, the message that the programmed recording cannot be performed is displayed on the display unit when the video signals cannot be recorded on the recording medium loaded at the predetermined position. Even if the recording medium corresponding to the programmed recording item to be performed first is the DVD loaded at the predetermined position, the message that the programmed recording cannot be performed is displayed on the display unit when the DVD loaded at the predetermined position does not have a storage space. In a case in which the recording medium corresponding to the programmed recording item to be performed first is the DVD loaded at the predetermined position, if the video signals are recorded on the DVD loaded at the predetermined position in accordance with a set recording mode, a message that the DVD has an insufficient storage space is displayed on the display unit when a recordable time is shorter than a recording time required to perform the programmed recording. When the message that the DVD has an insufficient storage space is displayed on the display unit, the recording mode set at that time is displayed on the display unit. In addition, the recording mode includes a switching mode and a non-switching mode. In a case in which the recording mode is set to the switching mode, the programmed recording mode for recording the video signals on the videotape is automatically switched to the programmed recording mode for recording the video signals on the DVD in a state in which the video signals cannot be recorded on the videotape, and the programmed recording mode for recording the video signals on the DVD is automatically switched to the programmed recording mode for recording the video signals on the videotape in a state in which the video signals cannot be recorded on the DVD. Further, in a case in which the recording mode is set to the non-switching mode, when the video signals cannot be recorded on the corresponding recording medium, the programmed recording stops.

It is displayed which recording medium the video signals are recorded on in a programmed recording item to be performed first. In addition, in a case of programmed recording in which it is not necessary to rapidly load a recording medium at the predetermined position, even when the recording medium corresponding to the programmed recording is not loaded at the predetermined position, a message that the programmed recording cannot be performed is not displayed. In addition, when the recording medium loaded at the predetermined position is a recording medium on which signals cannot be recorded, a message that the programmed recording cannot be performed is displayed. In addition, when the recording medium loaded at the predetermined position has an insufficient storage space, the message that the programmed recording cannot be performed is displayed. In addition, when the storage space is insufficient, the recording mode set at that time is displayed on the display unit. In addition, when the recording medium corresponding to the programmed recording is not loaded at the predetermined position, the programmed recording is performed on the recording medium not corresponding to the programmed recording.

According to another aspect of the present invention, there is provided with a multifunctional recording and reproducing apparatus includes a first recording unit that records video signals on a first recording medium which can be ejected from a main body; a second recording unit that records the video signals on a second recording medium which can be ejected from the main body; a programmed recording control unit that accepts setting of a programmed recording mode for recording the video signals on the first recording medium and setting of a programmed recording mode for recording the video signals on the second recording medium; and a display unit that is provided on the main body. In the multifunctional recording and reproducing apparatus, the first and second recording media are different types of recording media, and a message indicating whether a recording medium corresponding to a programmed recording item to be performed first among a plurality of programmed recording items set by the programmed recording control unit is the first recording medium or the second recording medium is displayed on the display unit. That is, on a screen for programmed recording to be performed first, which recording medium the video signals are recorded on is displayed.

In addition to the above aspects, when the recording medium corresponding to the programmed recording item to be performed first is not loaded at a predetermined position, a message that programmed recording cannot be performed is displayed on the display unit. When the recording medium corresponding to the programmed recording item to be performed first is loaded at the predetermined position, the message that the programmed recording cannot be performed is not displayed on the display unit even if a recording medium corresponding to another programmed recording item different from the programmed recording item to be performed first is not loaded at a predetermined position. That is, for the programmed recording in which a recording medium is not needed to be rapidly loaded at a predetermined position, even if the recording medium corresponding to the programmed recording is not loaded at the predetermined position, it is not displayed that the programmed recording cannot be performed.

Further, in addition to the above-aspects, even if the recording medium corresponding to the programmed recording item to be performed first is loaded at the predetermined position, when the video signals cannot be recorded on the recording medium loaded at the predetermined position, the message that the programmed recording cannot be performed is displayed on the display unit. That is, when the recording medium loaded at the predetermined position is a recording medium on which the video signals cannot be recorded, that is, a recording medium unsuitable for programmed recording, the message that the programmed recording cannot be performed is displayed.

Further, in addition to the above-aspects, even if the recording medium corresponding to the programmed recording item to be performed first is loaded at the predetermined position, when the recording medium loaded at the predetermined position does not have a storage space, the message that the programmed recording cannot be performed is displayed on the display unit. That is, when the recording medium loaded at the predetermined position is a recording medium having no storage space, that is, a recording medium unsuitable for programmed recording, the message that the programmed recording cannot be performed is displayed.

Moreover, in addition to the above-aspects, in a case in which the recording medium corresponding to the programmed recording item to be performed first is loaded at the predetermined position, if the video signals are recorded on the recording medium loaded at the predetermined position in accordance with a set recording mode, a message that the recording medium has an insufficient storage space is displayed on the display unit when a recordable time is shorter than a recording time required to perform the programmed recording. That is, when the recording medium loaded at the predetermined position has an insufficient storage space, the message that the programmed recording cannot be performed is displayed on the display unit.

In addition, when the message that the recording medium has an insufficient storage space is displayed on the display unit, the recording mode set at that time is displayed on the display unit. That is, when a recording medium has an insufficient storage space, the recording mode set at that time is displayed.

Further, according to another aspect of the invention, a multifunctional recording and reproducing apparatus includes a first recording unit that records video signals on a first recording medium which can be ejected from a main body; a second recording unit that records the video signals on a second recording medium which can be ejected from the main body; and a programmed recording control unit that accepts setting of a programmed recording mode for recording the video signals on the first recording medium and setting of a programmed recording mode for recording the video signals on the second recording medium. In the multifunctional recording and reproducing apparatus, the first and second recording media are different types of recording media. In addition, on a display screen used by the programmed recording control unit for setting programmed recording, the first recording medium or the second recording medium is selected as a recording medium corresponding to the programmed recording, and the selected recording medium is displayed. That is, by only using the display screen used by the programmed recording control unit for setting programmed recording, one of the first and second recording media is selected as a recording medium for programmed recording. In addition, the selected recording medium is displayed on the screen.

Further, in addition to the above-aspects when the first recording medium is selected as the recording medium corresponding to the programmed recording, a recording mode that is set corresponding to the first recording medium is set as a selection. When the second recording medium is selected as the recording medium corresponding to the programmed recording, a recording medium that is set corresponding to the second recording medium is set to as a selection. That is, when the recording medium is selected, only the recording mode corresponding to the set recording medium can be selected.

Furthermore, in addition to the above-aspects when a plurality of the programmed recording items is set, a programmed recording item to be performed first is displayed on the display screen used for setting the programmed recording items such that it can be discriminated from the other programmed recording items. That is, it is possible for a user to recognize which programmed recording item is performed first.

According to above-aspects of the invention, on a screen for programmed recording to be performed first, which recording medium the video signals are recorded on is displayed. In addition, for programmed recording in which it is not necessary to rapidly load a recording medium at a predetermined position, even when the recording medium corresponding to the programmed recording is not loaded at the predetermined position, a message that the programmed recording cannot be performed is not displayed. In addition, when the recording medium loaded at the predetermined position is a recording medium on which video signals cannot be recorded, that is, a recording medium unsuitable for programmed recording, the message that the programmed recording cannot be performed is displayed. Further, when the recording medium loaded at the predetermined position is a recording medium unsuitable for programmed recording because it has no storage space, the message that the programmed recording cannot be performed is displayed. In addition, when the recording medium loaded at the predetermined position has an insufficient storage space, the message that the programmed recording cannot be performed is displayed. Furthermore, when the storage space is insufficient, the recording mode set at that time is displayed on the display unit. In addition, when the recording medium corresponding to the programmed recording is not loaded at the predetermined position, the programmed recording is performed on the recording medium not corresponding to the programmed recording. Therefore, a user can recognize on which recording medium the video signals are recorded on a screen for programmed recording to be performed first. In addition, even if the recording medium corresponding to the programmed recording is not loaded at the predetermined position, when it is not necessary that the recording medium be rapidly loaded at the predetermined position, it can be prevented that the user loads the recording medium at the predetermined position rapidly. In addition, the user can recognize that an unsuitable recording medium is set and that a recording medium set for programmed recording has an insufficient storage space. Also, the user can recognize a recording mode when a storage space is insufficient. In addition, when the recording medium corresponding to the programmed recording is not loaded at the predetermined position, the programmed recording can be performed on the recording medium not corresponding to the programmed recording.

Further, since the recording medium on which recording of the video signal corresponding to the programmed recording to be performed first is performed is displayed on the display unit, the user can recognize the recording medium on which recording of the video signal corresponding to the programmed recording to be performed first is performed.

In addition, for the programmed recording in which it is not necessary to load the recording medium at the predetermined position rapidly, even when the recording medium corresponding to the programmed recording is not loaded at the predetermined position, the message that the programmed recording cannot be performed is displayed on the display unit. Therefore, even though the recording medium corresponding to the programmed recording is not loaded at the predetermined position, when it is not necessary that the recording medium be rapidly loaded at the predetermined position, it can be prevented that the user loads the recording medium at the predetermined position rapidly.

Furthermore, when the recording medium loaded at the predetermined position is a recording medium on which video signals cannot be recorded, that is, a recording medium unsuitable for programmed recording, the message that the programmed recording cannot be performed is displayed. Therefore, the user can recognize that an unsuitable recording medium is set.

Moreover, when the recording medium loaded at the predetermined position is a recording medium unsuitable for programmed recording because it has no storage space, the message that the programmed recording cannot be performed is displayed. Therefore, the user can recognize that an unsuitable recording medium is set.

In addition, when the recording medium loaded at the predetermined position is a recording medium having an insufficient storage space, the message that the programmed recording cannot be performed is displayed. Therefore, the user can recognize that a recording medium set for programmed recording has an insufficient storage space.

Further, when a storage space is insufficient, the recording mode set at that time is displayed. Therefore, the user can recognize a recording mode when a storage space is insufficient.

In addition, according to the above-aspects of the invention, the programmed recording control unit uses a display screen used for setting programmed recording, so that a first recording medium or a second recording medium can be set as a recording medium for programmed recording. In addition, the selected recording medium is displayed on the display screen. Therefore, the user can easily replace and confirm a recording medium used for programmed recording.

Further, when a recording medium is selected, only the recording mode corresponding to the selected recording medium can be selected. Therefore, a recording mode can be easily selected.

Furthermore, which programmed recording is performed first is displayed, so that the user can easily recognize the programmed recording to be performed first.

DESCRIPTION OF THE PREFERRED EMBODIMENTS

Hereinafter, a preferred embodiment of the present invention will be described with reference to the accompanying drawings.

Figure 1:
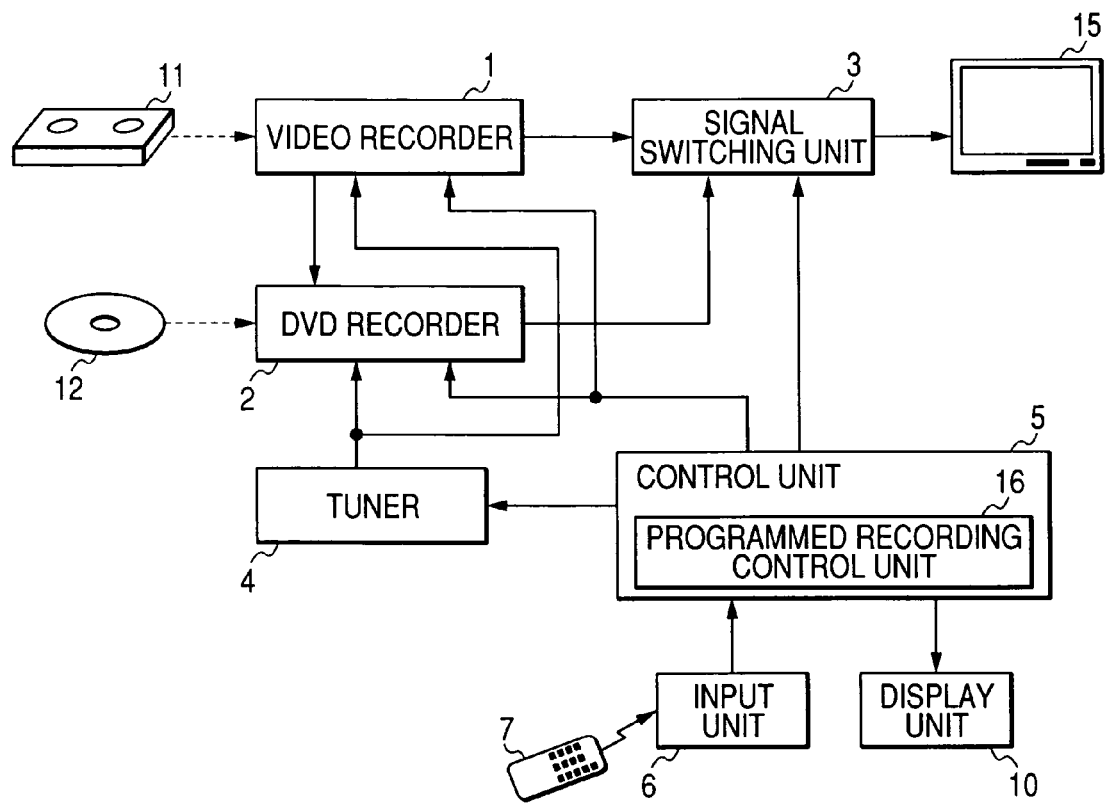
FIG. 1 is a block diagram showing the electrical structure of a multifunctional recording and reproducing apparatus according to an embodiment of the invention.
Figure 2:
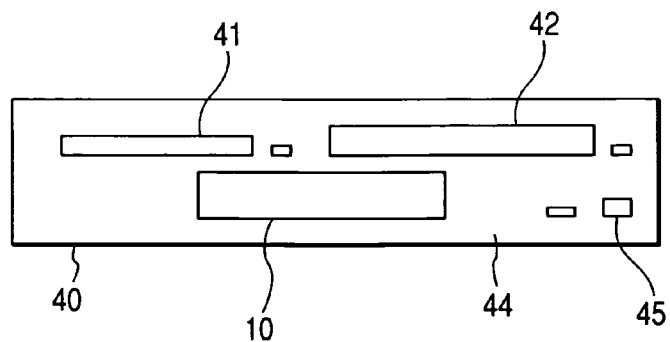
FIG. 2 is an explanatory view showing the shape of a front panel of the multifunctional recording and reproducing apparatus according to the embodiment of the invention.
Figure 3:
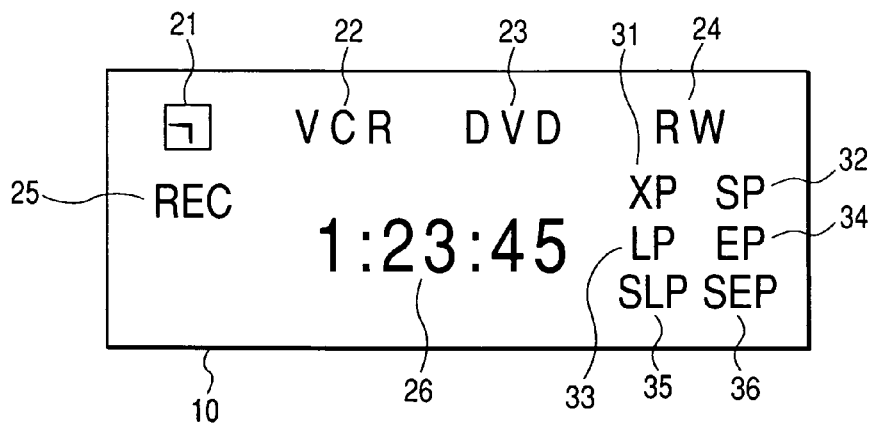
FIG. 3 is an explanatory view showing a display unit according to the embodiment of the invention.

FIG. 1 is a block diagram showing the electrical structure of a multifunctional recording and reproducing apparatus according to a first embodiment of the present invention. More particularly, FIG. 1 shows a dual recorder for recording or reproducing video signals on or from a videocassette tape (hereinafter, referred to as a videotape) or a DVD, serving as a recording medium. In addition, FIG. 2 is an explanatory view showing the shape of a front panel of the multifunctional recording and reproducing apparatus according to the first embodiment of the invention, and FIG. 3 is an explanatory view showing a display unit of the multifunctional recording and reproducing apparatus according to the first embodiment of the invention.

In FIG. 1, a video recorder (first recording unit) 1 records video signals output from a tuner unit 4 or video signals supplied from the outside through a path (not shown) on a videotape 11, functioning as a first recording medium which can be ejected from a main body 40 of the multifunctional recording and reproducing apparatus. In addition, the video recorder 1 reproduces the video signals recorded on the videotape 11 and supplies them to a signal switching unit 3 and a DVD recorder 2.

The DVD recorder (second recording unit) 2 records video signals output from the tuner unit 4, the video signals output from the video tuner unit 1, or video signals supplied from the outside through a path (not shown) on a DVD (DVD-R, DVD-RW, or the like) 12, functioning as a second recording medium which can be ejected from the main body 40 of the multifunctional recording and reproducing apparatus. In addition, the DVD recorder 2 reproduces the video signals recorded on the DVD 12 and supplies them to the signal switching unit 3.

The signal switching unit 3 outputs the video signal output from the video recorder 1 or the video signal output from the DVD recorder 2 to a television receiver 15 provided at the outside in accordance with instructions from a control unit 5. The tuner unit 4 receives commercial broadcasting of a channel instructed by the control unit 5 and outputs video signals obtained from the received broadcasting signals to the video recorder 1 and the DVD recorder 2.

An input unit 6 includes a key switch, such as a power supply key 45 provided on the front panel 44 of the main body 40, and a receiving unit for receiving infrared signals transmitted from a remote controller 7. When the instruction of a user is input into the input unit 6, the input instruction is outputted to the control unit 5.

A display unit 10 is provided on the front panel 44 of the main body 40 and displays various information items through a fluorescent display tube. That is, the display unit 10 displays time information 26 indicating a reproduction position. In addition, when the subject of recording and reproduction is the DVD 12, a character display lamp 23 displays characters 'DVD'. When the DVD 12 is of the DVD-R type, only a character 'R' of characters 'RW' is displayed on a character display lamp 24. When the DVD 12 is of the DVD-RW type, two characters 'RW' are displayed thereon. In addition, one of six recording modes 31 to 36 is displayed. In addition, when the subject of recording and reproduction is the videotape 11, a character display lamp 22 displays characters 'VCR'. In addition, a character display lamp 32 displaying characters 'SP' indicating a standard mode or a character display lamp 35 displaying characters 'SLP' indicating a triple mode is turned on. In addition, a display lamp for a clock mark 21 and a character display lamp 25 for characters 'REC' are turned on, if necessary.

The control unit 5 is constructed by using a microcomputer as a main component and controls the operation of the dual recorder. That is, in a VCR mode, when the instruction of reproduction is input, the control unit 5 controls the operation of the video recorder 1 to reproduce the video signals recorded on the videotape 11, and then transmits the reproduced video signals to the television receiver 15. In addition, when the instruction of recording is input, the control unit 5 controls the operation of the video recorder 1 to record, on the videotape 11, the video signals output from the tuner unit 4 (or the video signals output from the outside).

In addition, in the DVD mode, when the instruction of reproduction is input, the control unit 5 controls the operation of the DVD recorder 2 to reproduce the video signals recorded on the DVD 12 and then transmits the reproduced video signals to the television receiver 15. When the instruction of recording is input, the control unit 5 controls the operation of the video recorder 1 to record, on the DVD 12, the video signals output from the tuner unit 4 (or the video signals output from the video recorder 1 or the video signals input from the outside).

A programmed recording control unit 16 is composed of a block executing some of the functions of a microcomputer constituting the control unit 5, and accepts setting of the programmed recording using the videotape 11 as a recording medium and setting of the programmed recording using the DVD 12 as a recording medium. In addition, in a waiting state after the setting of programmed recording is completed, whether the recording medium used for the programmed recording to be performed first is the videotape 11 or the DVD 12 is displayed on the display unit 10 by the programmed recording control unit 16.

That is, in the programmed recording to be performed first, when the videotape 11 is selected as a recording medium for the video signals, the programmed recording control unit 16 allows the character display lamp 22 to display the characters 'VCR' on the display unit 10, and allows the character display lamp 23 not to display the characters 'DVD' thereon. In the programmed recording to be performed first, when the DVD 12 is selected as a recording medium of the video signals, the programmed recording control unit 16 allows the character display lamp 23 to display the characters 'DVD' on the display unit 10 and allows the character display lamp 22 not to display the characters 'VCR'.

In addition, when the recording medium selected during the programmed recording to be performed first is not loaded at a predetermined position, the programmed recording control unit 16 displays on the display unit 10 that the programmed recording cannot be performed. That is, in a case in which the recording medium selected during the programmed recording to be performed first is the DVD 12, when the DVD 12 is not loaded on a tray 41 of the DVD recorder 2, the clock mark 21 flickers. In addition, at this time, the character display lamp 23 displaying the characters 'DVD' also flickers.

Further, in a case in which the recording medium selected during the programmed recording to be performed first is loaded at a predetermined position, even if a recording medium corresponding to programmed recording different from the programmed recording to be performed first is not loaded at a predetermined position, the programmed recording control unit 16 does not display the purport that the programmed recording can not be performed. That is, it is assumed that the recording medium corresponding to the programmed recording to be performed first is the DVD 12, and that the DVD 12 is loaded on the tray 41 of the DVD recorder 2. In this case, even if the videotape 11 is not inserted into an insertion slot 42 regardless of whether the programmed recording where the videotape 11 is used as the subject of the programmed recording, the clock mark 21 flickers to indicate that the programmed recording can be performed, and the character display lamp 23 displaying the characters 'DVD' flickers to indicate that the programmed recording can be performed.

In addition, even if the recording medium corresponding to the programmed recording to be performed first is loaded at a predetermined position, when the video signals can be recorded on the recording medium loaded at the predetermined position, the programmed recording control unit 16 displays on the display unit 10 a message that the programmed recording cannot be performed. That is, in a case in which the recording medium corresponding to the programmed recording to be performed first is the DVD 12, when a disk loaded on the tray 41 is a CD or a read-only DVD, the clock mark 21 flickers in order to display the purport that the programmed recording cannot be performed. In addition, at this time, the character display lamp 23 displaying the characters 'DVD' flickers at the same time.

Further, even if the recording medium corresponding to the programmed recording to be performed first is loaded at a predetermined position, when the recording medium loaded at the predetermined position has no recording area, the programmed recording control unit 16 displays on the display unit 10 a message that the programmed recording cannot be performed. That is, in a case in which the recording medium corresponding to the programmed recording to be performed first is the DVD 12, when the DVD 12 loaded on the tray 41 has the video signals recorded on its entire data area, the clock mark 21 and the character display lamp 23 displaying the character 'DVD' flicker at the same time in order to display the purport that the programmed recording cannot be performed.

In addition, in a case in which the recording medium corresponding to the programmed recording to be performed first is loaded at the predetermined position, the video signal is recorded thereon in accordance with a recording mode set on the recording medium loaded at the predetermined position. In this case, when the time when recording can be performed is shorter than a recording time required to perform the programmed recording, the programmed recording control unit 16 displays on the display unit 10 a message that the recording medium has an insufficient recording area. In addition, the recording mode set at that time is also displayed on the display unit 10.

That is, in a case in which the recording medium corresponding to the programmed recording to be performed first is the DVD 12, in which a recording mode is an SP mode in which video signals corresponding to two hours can be recorded, and in which the programmed recording can be performed for one hour, when the DVD 12 loaded on the tray 41 has a storage space corresponding to thirty minutes in the SP mode, the character display lamp 32 displaying the characters 'SP' that indicates the set recording mode flickers. Therefore, the set recording mode and the shortage of the recording area are displayed (the clock mark 21 and the character display lamp 23 displaying the characters 'DVD' flicker to indicate that the programmed recording can be performed.

Further, in a case in which, of two modes, that is, a switching mode and a non-switching mode, the switching mode is selected (in initial setting, the modes can be set by a user), when the programmed recording control unit 16 performs programmed recording for recording video signals on a first recording medium in a state in which the first recording medium is not loaded at the predetermined position, the programmed recording control unit 16 records the video signals on a second recording medium. On the other hand, when the programmed recording for recording the video signals on the second recording medium is performed in a state in which the second recording medium is not loaded at the predetermined position, the programmed recording control unit 16 records the video signals on the first recording medium. In the embodiment of the invention, the programmed recording control unit 16 can set the switching mode and the non-switching mode. However, the programmed recording control unit 16 may set only the switching mode.

That is, in a case in which the recording mode is set to the switching mode, in the programmed recording where the videotape 11 is used as a recording medium, the videotape 11 is not inserted, the video signals are recorded on the DVD 12 instead of the video tape 11. In addition, when the DVD 12 is used as a recording medium to perform the programmed recording and the recordable DVD 12 is not loaded on the tray 41, the video signals are recorded on the videotape 11 instead of the DVD 12.

In addition, when the programmed recording is set, the programmed recording control unit 16 displays on a television receiver 15 a screen to set MONTH/DAY (or a day of the week, for example, in the order of Monday to Friday) 61, a recording starting time 62, a recording finishing time 63, a receiving channel 64, a recording medium 65 for recording video signals, and a recording mode 66. That is, it is possible to set the programmed recording using the video tape 11 as a recording medium and the programmed recording using the DVD 12 as a recording medium on the same screen of the television receiver 15, and also to replace recording media used for the programmed recording. In addition, the selected recording medium is displayed thereon.

Further, when the first recording medium is selected as the recording medium corresponding to the programmed recording, a recording mode corresponding to the first recording medium is selected. In addition, when the second recording medium is selected as the recording medium corresponding to the programmed recording, a recording mode corresponding to the second recording medium is selected. That is, when the DVD 12 is selected as a recording medium, the selections of the recording mode include six modes: an XP mode in which recording can be performed for one hour, an SP mode in which recording can be performed for two hours, an LP mode in which recording can be performed for four hours, an EP mode in which recording can be performed for six hours, an SLP mode in which recording can be performed for eight hours, and an SEP mode in which recording can be performed for ten hours (see FIG. 4A). In addition, when the videotape 11 is selected as a recording medium, the selections of the recording mode include two modes: an SP mode using a standard speed and an SLP mode in which a recording time extends three times (see FIG. 4B).

Figure 5:
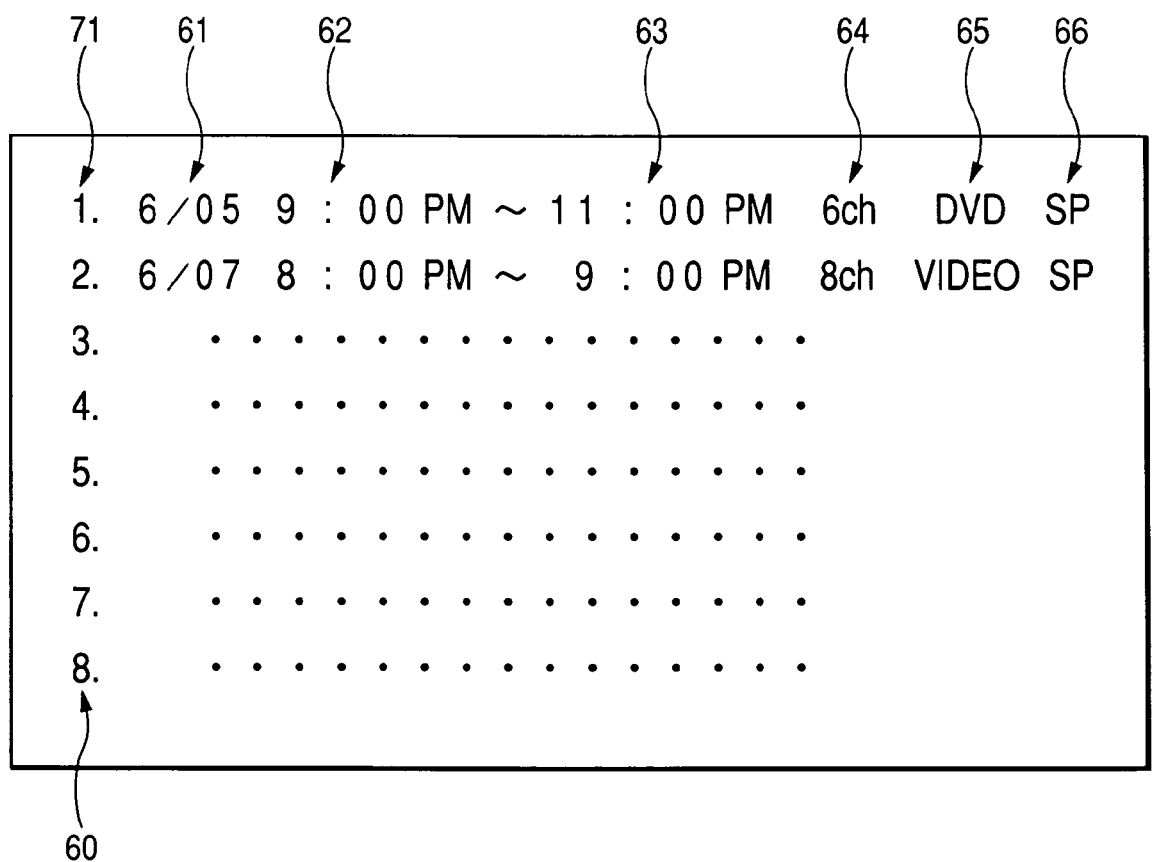
FIG. 5 is an explanatory view showing an aspect of the programmed recording setting screen.

Further, when a plurality of programmed recording items is set, the programmed recording to be performed first is displayed such that it can be discriminated from the other programmed recording. That is, as shown in FIG. 5, it is assumed that, for example, eight programmed recording items are set. In addition, when a programmed recording starting time (including the date and time) for a programmed recording No. '1' (which is indicated by reference numeral 71) is closest to the current time (including the date and time) (when a programmed recording item 71 having a programmed recording number '1' is earliest performed), the programmed recording item 71 having the programmed recording number '1' is displayed with a color (for example, yellow) different from display colors (for example, white) of the other programmed recording items.

An operation of setting programmed recording according to the above-mentioned embodiment will be described.

When setting of programmed recording is selected using, for example, the remote controller 7, a setting screen having six setting sections 61 to 66 is displayed on the television receiver 15 for each programmed recording number (indicated by reference numeral 60), as shown in FIG. 5. More specifically, the setting section 61 sets the date and time for programmed recording (a day of the week or Monday to Friday). In addition, the setting section 62 sets a programmed recording starting time, and the setting section 63 sets a programmed recording finishing time. Further, the setting section 64 sets a receiving channel. In addition, the setting section 65 sets a recording medium, which is a programmed recording target, and the setting section 66 sets a recording mode.

Figure 4A:
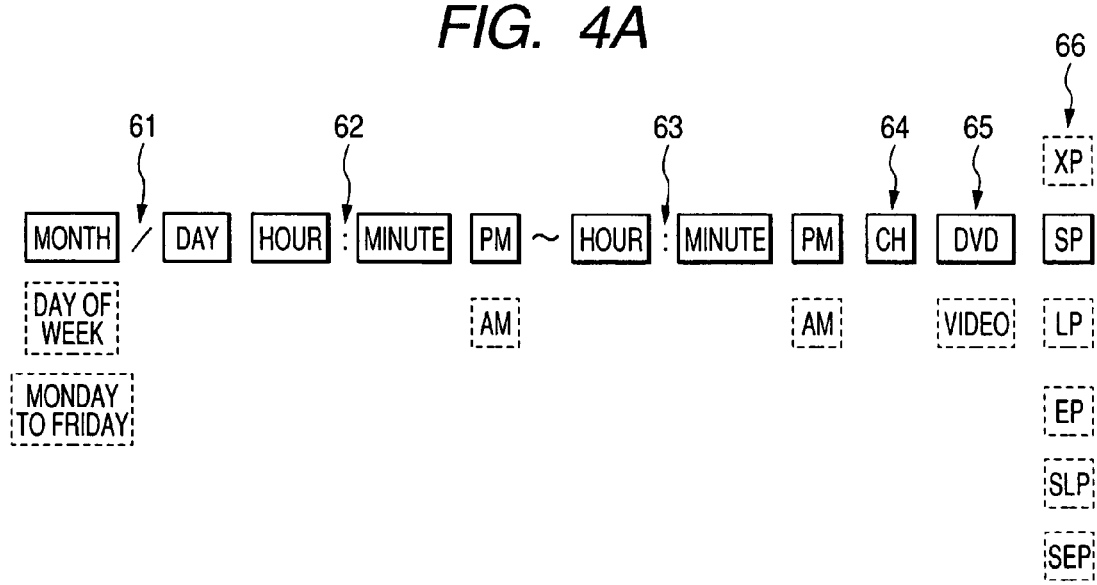
FIG. 4 is an explanatory view showing setting items on a programmed recording setting screen.
Figure 4B:
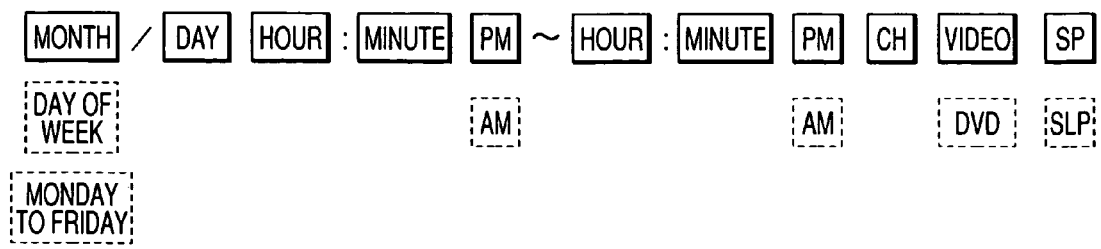

In addition, when the DVD is selected in the setting section 65, as the recording mode, the six modes including the XP mode, the SP mode, the LP mode, the EP mode, the SLP mode, and the SEP mode are arranged as selections, as shown in FIG. 4A. Therefore, a user selects one of the six modes. In addition, when the videotape 11 is selected as a recording medium, as a recording mode, the two modes including the SP mode and the SLP mode are arranged as selections, as shown in FIG. 4B. Therefore, the user selects one of the two modes.

In addition, when the above-mentioned programmed recording is performed, the setting sections corresponding to the programmed recording to be performed first are displayed with yellow among the plurality of programmed recording items of which setting is completed, and the setting sections corresponding to the other programmed recording are displayed with white. Therefore, by only seeing the setting screens of the programmed recording, the user can immediately recognize a programmed recording item to be performed first in the waiting state.

In addition, it is possible to select a recording medium, the video tape 11 or the DVD 12, used for each programmed recording by moving a cursor (not shown) to the setting section 65 and then by operating upper and lower keys. Therefore, it is possible to more easily select a recording medium to be used. In addition, with respect to the programmed recording in which the recording medium has been already selected, if the programmed recording is selected and then the upper and lower keys are operated after the cursor is moved to the setting section 65 of the selected programmed recording, a recording medium used for the programmed recording can be changed from the videotape 11 to the DVD 12 or from the DVD 12 to the videotape 11. That is, it is possible to replace a recording medium used for programmed recording very simply and easily. In addition, by only seeing one setting screen, the user can immediately recognize whether a recording medium to be used is the videotape 11 or the DVD 12.

Figure 6:
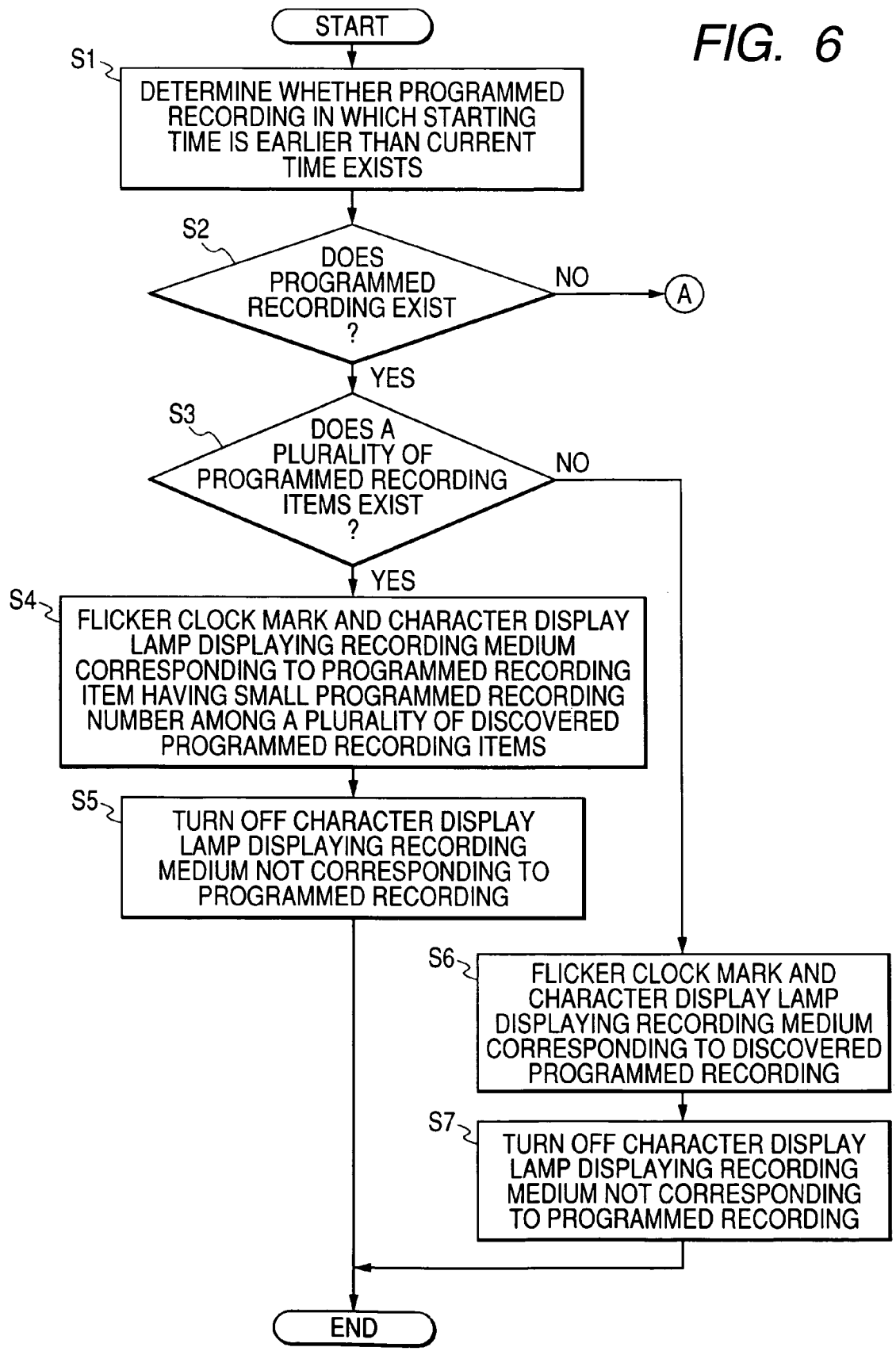
FIG. 6 is a flow chart showing a display operation in a waiting state according the embodiment of the invention.
Figure 7:
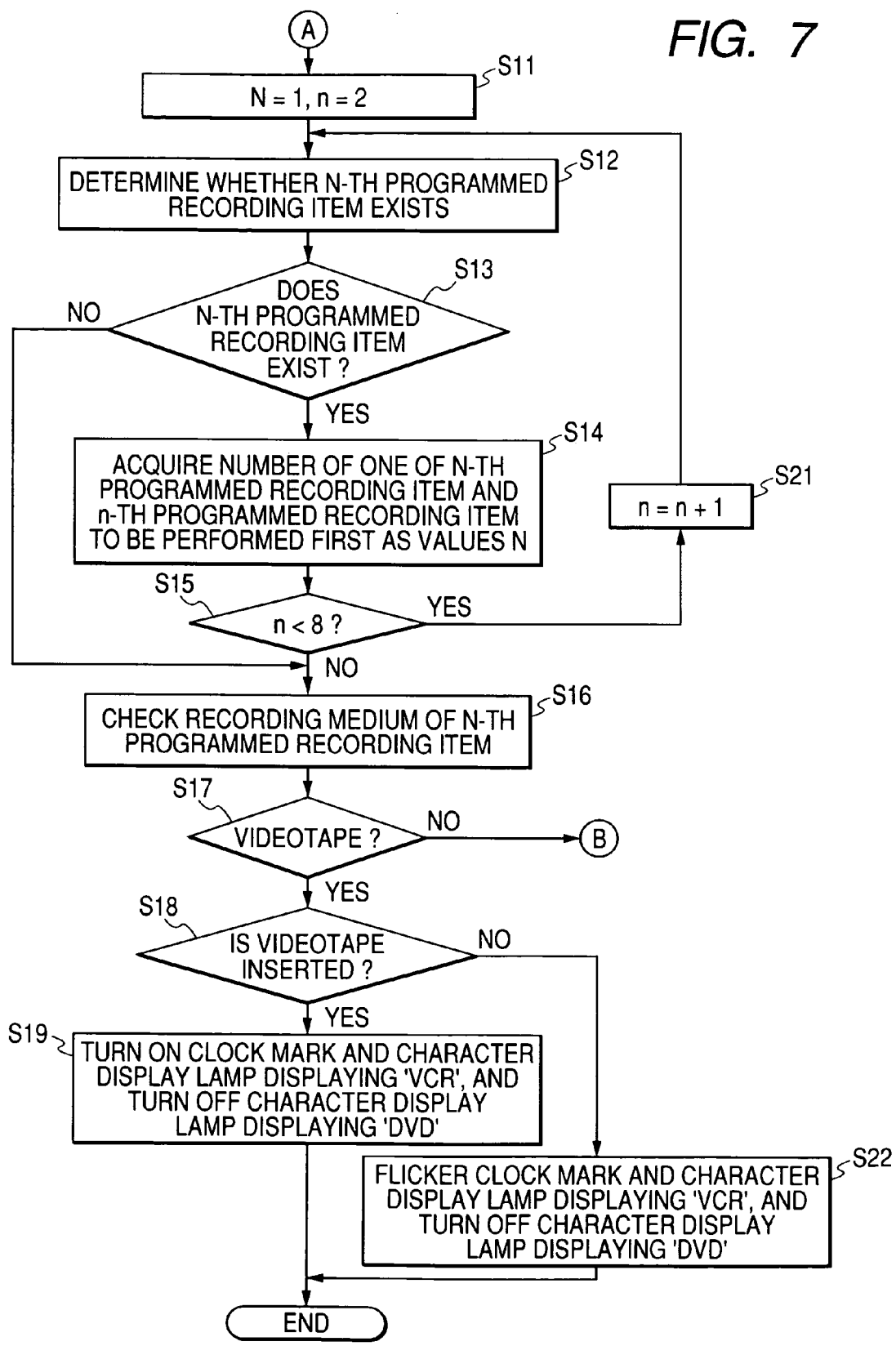
FIG. 7 is a flow chart showing the display operation in the waiting state according the embodiment of the invention.
Figure 8:
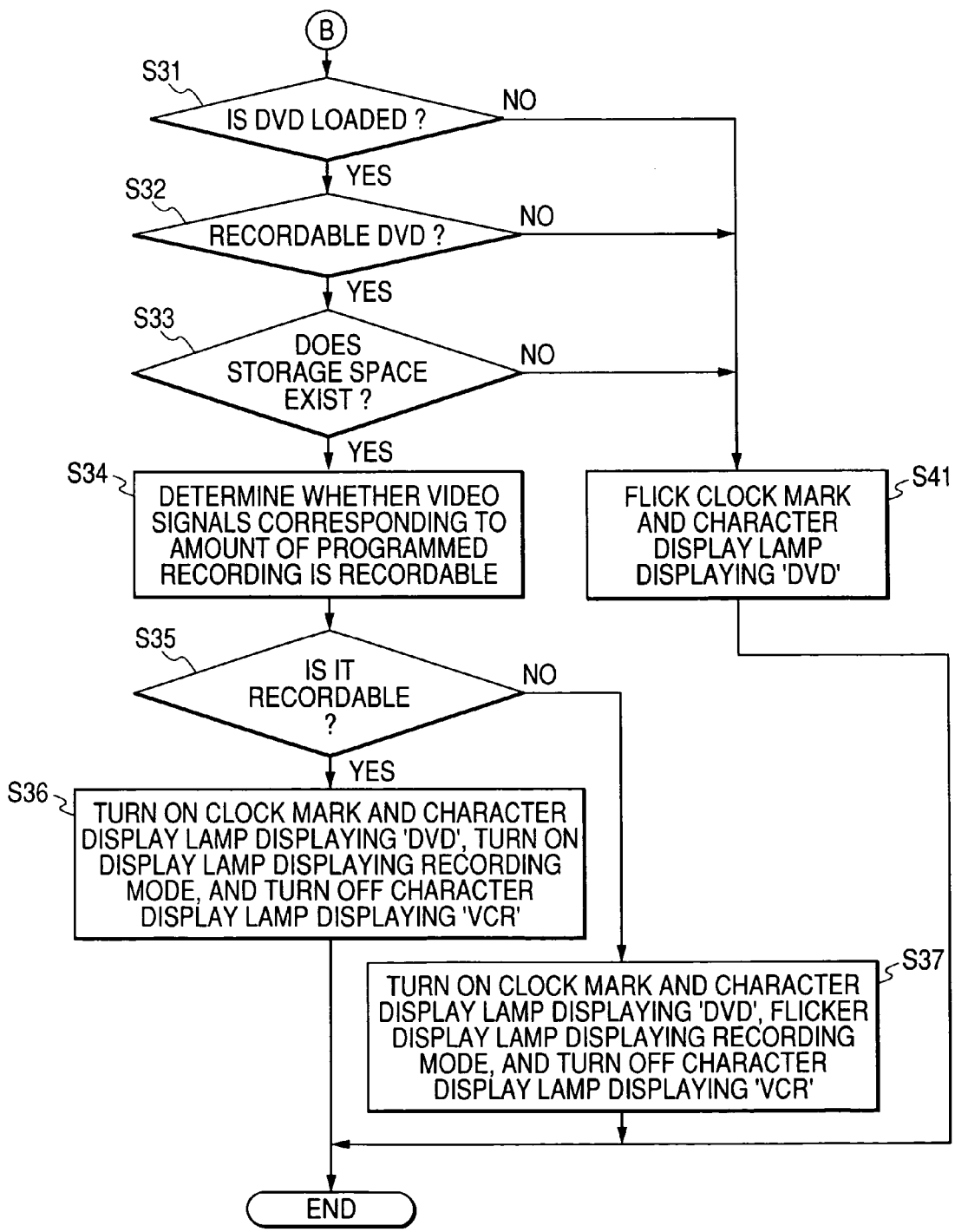
FIG. 8 is a flow chart showing the display operation in the waiting state according the embodiment of the invention.

FIGS. 6 to 8 are flow charts showing a display operation in the waiting state according the present embodiment. The display operation in the waiting state according to this embodiment will be described with reference to FIGS. 6 to 8, if necessary.

In the following description, it is assumed that, when the programmed recording is completed, the set programmed recording is erased. In addition, in a case in which programmed recording cannot be performed, when the current time passes the finishing time, the setting is erased. Further, whenever the setting of programmed recording is erased, the programmed number of the erased programmed recording is allocated to programmed recording immediately subsequent to the erased programmed recording (programmed recording item having a larger programmed recording number) and a programmed recording number subsequent to the erased programmed recording item is changed. After that, a number of programmed recording subsequent to the programmed recording is sequentially and automatically assigned and changed in small numerical order.

The operation in the waiting state will be described while stopping the above-mentioned complementary description. In the waiting state, the programmed recording control unit 16 determined whether there is programmed recording in which a start time is faster than the current time, including the date and time. That is, the programmed recording control unit 16 determines whether there is programmed recording which has not yet executed because a recording medium was not loaded at a predetermined position although the programmed recording has already started (step 1). In addition, when the corresponding programmed recording is discovered, the programmed recording control unit 16 determines whether the number of the corresponding programmed recording is one or two or more. When the number of the corresponding programmed recording is one, the character display lamp indicating the recording medium corresponding to the discovered programmed recording (one of the character display lamp 22 displaying the characters 'VCR' and the character display lamp 23 displaying the characters 'DVD') and the clock mark 21 flicker, and the character display lamp indicating the other recording media not corresponding to the programmed recording (the other of the character display lamp 22 displaying the characters 'VCR' and the character display lamp 23 displaying the characters 'DVD') are turned off (steps S2, S3, S6, and S7).

On the other hand, when the number of the corresponding programmed recording is two or more, the character display lamp indicating the recording medium corresponding to the programmed recording having the smallest programmed recording number (one of the character display lamp 22 displaying the characters 'VCR' and the character display lamp 23 displaying the characters 'DVD') and the clock mark 21 flicker. However, the character display lamp indicating the other recording medium not corresponding to the programmed recording (the other of the character display lamp 22 displaying the characters 'VCR' and the character display lamp 23 displaying the characters 'DVD') is turned off (steps S2 to S5).

In addition, when there is no programmed recording in which the starting time is faster than the current time, the operation proceeds from step S2 to step S11, and the programmed recording control unit 16 inputs an initial value 1 to a variable N and inputs an initial value 2 to a variable n. Next, the programmed recording control unit 16 determines whether an n-th programmed recording item (in this case, a second programmed recording item) is set (step S12). When the n-th programmed recording item is set, the programmed recording control unit 16 determines which of the N-th programmed recording item and the n-th programmed recording item is performed earlier, and then a programmed recording number corresponding to the programmed recording item to be performed first is acquired as a value N (steps S13 and S14).

Further, after the value n is updated by one (step S21), the operation returns to step S12, and the programmed recording control unit 16 determines whether the n-th programmed recording item (in this case, a third programmed recording item) is set. After that, a loop operation composed of steps S12 to S15 and step S21 is repeatedly performed until the value n becomes 8 or until reaching a state in which the n-th programmed recording item is not set. As a result, a programmed recording number of N indicates a programmed recording to be performed first item to be performed first.

Next, the programmed recording control unit 16 checks the recording medium corresponds to the N-th programmed recording (step S16). When the recording medium is the videotape 11, it is determined whether the videotape 11 is inserted into the insertion slot 42 (whether the videotape is loaded at a predetermined position) (steps S17 and S18). When the videotape 11 is inserted into the insertion slot 42, the programmed recording in which the videotape 11 is used as a recording medium is performed first, and can be performed without any interruption. For this reason, the programmed recording control unit 16 allows the clock mark 21 and the character display lamp 22 displaying the characters 'VCR' to flicker, and also allows the character display lamp 23 displaying the character 'DVD' to be turned off (step S19).

On the other hand, in step S18, when the videotape 11 is not inserted into the insertion slot 42, the programmed recording in which the videotape 11 is used as a recording medium is performed first. In addition, since the videotape 11 is not inserted into the insertion slot 42, the programmed recording cannot be performed. For this reason, the programmed recording control unit 16 allows the clock mark 21 and the character display lamp 22 displaying the characters 'VCR' to flicker, and also allows the character display lamp 23 displaying the characters 'DVD' to be turned off (step S22). Therefore, by seeing the display screen, the user can immediately recognize that he has to insert the videotape 11 into the insertion slot.

In addition, when a recording medium to be used for the programmed recording is a DVD, the operation proceeds from step S17 to step 31. Then, it is determined whether the DVD 12 is loaded at a predetermined position. In addition, when it is determined that the DVD 12 is loaded at the predetermined position, it is determined whether the video signals can be recorded on the DVD 12 loaded at the predetermined position (step S32). Further, when it is determined that the video signals can be recorded on the DVD 12 loaded at the predetermined position can record, it is determined whether a storage space exists or not (step S33).

When it is determined that the storage space exists, it is determined whether video signals corresponding to the time set in the programmed recording can be recorded in the storage space. Then, when it is determined that the video signals corresponding to the set time can be recorded in the storage space, the programmed recording to be performed first can be performed on the DVD 12 using the set recording mode without, any interruption. For this reason, the programmed recording control unit 16 allows the clock mark 21 and the character display lamp 23 displaying the characters 'DVD' to be turned on, and allows the character display lamp 22 displaying the characters 'VCR' to be turned off. In addition, the character display lamp displaying the set recording mode (for example, the character display lamp 32 displaying the characters 'SP' or the character display lamp 33 displaying the characters 'LP') is turned on (steps S35 and S36).

On the other hand, when it is determined that the storage space exists, but the size of the storage space is insufficient for recording the video signals corresponding to the time set in the programmed recording, the programmed recording to be performed first is performed on the DVD 12 having the storage space. For this reason, the programmed recording control unit 16 allows the clock mark 21 and the character display lamp 23 displaying the characters 'DVD' to be turned on, and allows the character display lamp 22 displaying the characters 'VCR' to be turned off. However, since the storage space is insufficient in the recording mode currently set, interruption occurs in recording the video signals corresponding to the designated time. Therefore, by flickering the character display lamp displaying the set recording mode (for example, the character display lamp 32 displaying the characters 'SP' or the character display lamp 33 displaying the characters 'LP'), in the set recording mode, it is displayed that the storage space is insufficient (steps S35 and S37).

On the other hand, when it is determined in step S31 that the DVD 12 is not loaded at the predetermined position, when it is determined in step S32 that the video signals cannot recorded on the DVD 12 loaded at the predetermined position, or when it is determined that the DVD 12 loaded at the predetermined position does not have a sufficient storage space, the programmed recording to be performed first is concerned with the DVD 12, but cannot be performed. For this reason, the programmed recording control unit 16 allows the clock mark 21 and the character display lamp 23 displaying the characters 'DVD' to flicker. In addition, at this time, the character display lamp 22 displaying the characters 'VCR' is turned off (step S41).

In addition, there is a possibility that contents displayed on the display unit 10 will be changed whenever one minute, which is the minimum unit of the setting time in programmed recording, elapses. Also, there is a possibility that the setting of programmed recording will be changed in a state in which a power supply is turned on. For this reason, the programmed recording control unit 16 checks the setting state of programmed recording whenever a minute elapses, and contents are displayed on the display unit 10 based on the result. Even though the power supply is turned off, the programmed recording control unit 16 checks the setting state of the programmed recording and allows the contents to be displayed on the display unit 10 based on the result.

Figure 9:
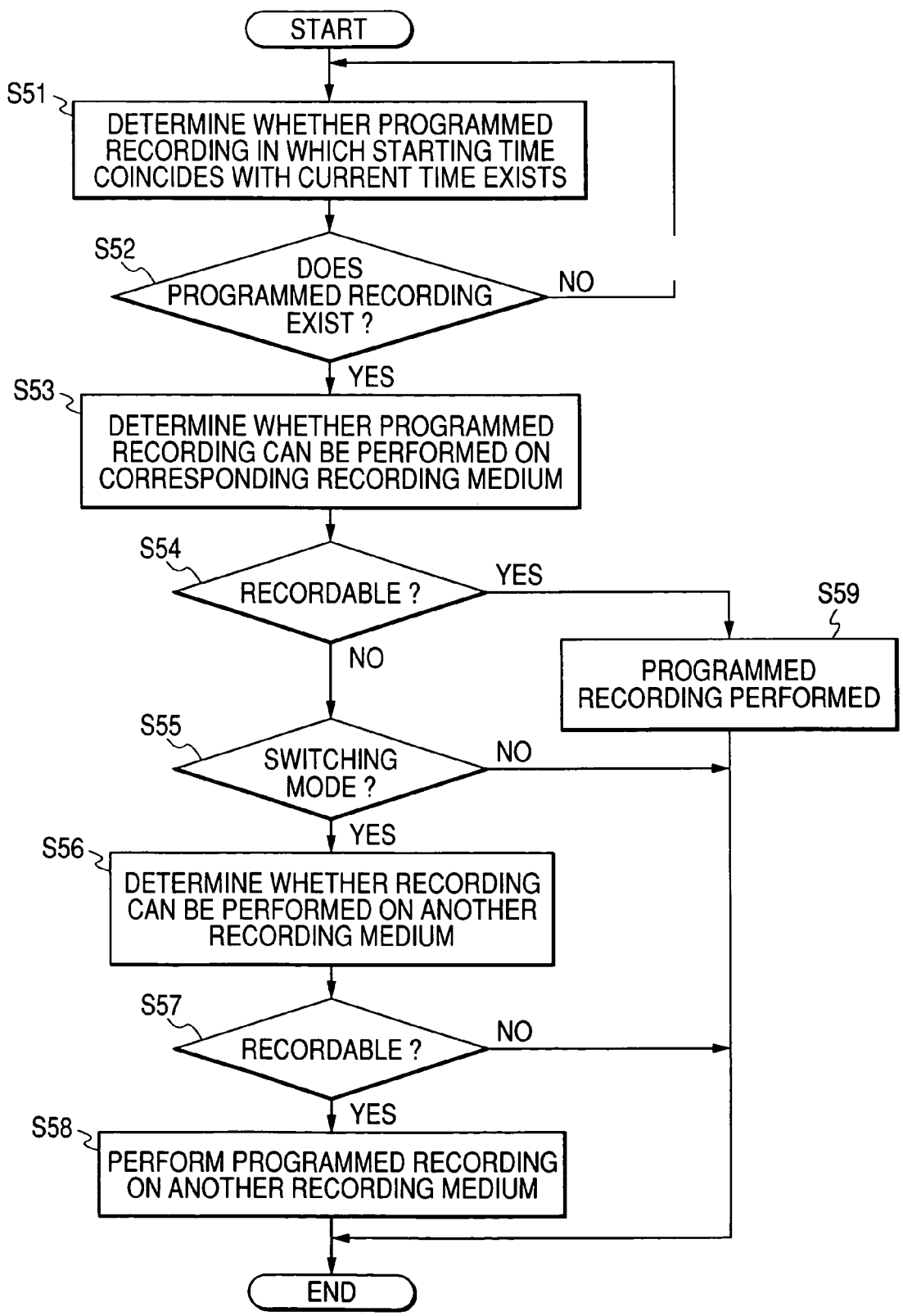
FIG. 9 is a flow chart showing the main operation of the embodiment when programmed recording is performed.

FIG. 9 is a flow chart showing the main operation of the present embodiment at the time when programmed recording is performed. The operation of this embodiment will be described with reference to FIG. 9, if necessary.

The programmed recording control unit 16 determines whether programmed recording is simultaneously performed with the above-mentioned display operation. That is, it is determined whether programmed recording exists in which recording start date and time coincide with the current date and time (steps S51 and S52). When programmed recording is discovered in which the recording start date and time coincide with the current date and time, it is determined whether the discovered programmed recording can be performed. That is, it is determined whether a recording medium corresponding to the programmed recording is loaded at a predetermined position. When the recording medium is loaded at the predetermined position, it is determined whether the recording medium is in a recordable state (step S53). When the recording medium is loaded at the predetermined position and the recording medium is in a video signal recordable state, the programmed recording is performed (steps S54 and S59).

On the other hand, when the recording medium corresponding to the discovered programmed recording is not loaded at the predetermined position, or when the corresponding recording medium is loaded at the predetermined position, but the video signals cannot be recorded thereon, the programmed recording control unit 16 checks which of the switching mode and the non-switching mode is set. When the recording mode is the switching mode, it is determined whether the video signals can be recorded using another recorder (steps S54 to S56). When the video signals can be recorded using another recorder, the programmed recording is performed using another recorder. On the other side, when the video signals cannot be recorded using another recorder, the programmed recording stops (steps S57 and S58).

Specifically, in a case in which the discovered programmed recording is programmed recording related to the videotape 11, when it is determined that the videotape 11 is not inserted or when it is determined that recording is prohibited on the inserted videotape 11, the programmed recording control unit 16 determines whether the video signals can be recorded using the DVD recorder 2. That is, it is determined whether the DVD 12 is loaded in the DVD recorder 2 and whether the video signals can be recorded on the loaded DVD 12. When the video signals can be recorded using the DVD recorder 2, the programmed recording for the videotape 11 is performed on the DVD 12.

In addition, in a case in which the discovered programmed recording is programmed recording related to the DVD 12, when it is determined that the DVD 12 is not loaded at a predetermined position or that the video signals cannot be recorded on the DVD 12 loaded at the predetermined position, the programmed recording control unit 16 determines whether the video signals can be recorded using the video recorder 1. That is, it is determined whether the videotape 11 is loaded in the video recorder 1 and whether the video signals can be recorded on the inserted videotape 11. When the video signals can be recorded using the video recorder 1, the programmed recording for the DVD 12 is performed on the videotape 11.

What is claimed is:

1. A multifunctional recording and reproducing apparatus, comprising:
a video recorder that records video signals on a videotape;
a DVD recorder that records the video signals on a DVD;
a programmed recording control unit that accepts a program setting for recording the video signals on the videotape and a program setting for recording the video signals on the DVD, wherein the apparatus goes into a waiting state where a power supply of the multifunctional recording and reproducing apparatus is turned off after the programmed recording control unit finishes accepting the settings; and
a display unit provided on a main body, wherein a message is displayed on the display unit while the apparatus is in the waiting state where the power supply of the multifunctional recording and reproducing apparatus is turned off, the message indicates whether a recording to be performed first is for the videotape recording or for the DVD recording, such that the first recording is identified from a plurality of programmed settings accepted by the programmed recording control unit, the message further includes:
when a recording medium corresponding to the first recording is not loaded at a predetermined position, a message indicating that the first recording cannot be performed is displayed,
when a recording medium corresponding to the first recording is loaded at a predetermined position, but a recording medium corresponding to another recording is not loaded at a predetermined position, a message indicating that the first recording cannot be performed is not displayed,
when a recording medium corresponding to the first recording is loaded at a predetermined position, but the video signals cannot be recorded on the recording medium, a message indicating that the first recording cannot be performed is displayed,
when a recording medium corresponding to the first recording is a DVD loaded at a predetermined position, and the DVD does not have a storage space, a message indicating that the first recording cannot be performed is displayed,
when a recording medium corresponding to the first recording is the DVD loaded at a predetermined position and the video signals are to be recorded on the DVD in accordance with a recording mode selected previously, if a recordable time on the DVD is shorter than a time required to record the first recording, a message indicating that the DVD has an insufficient storage space is displayed, and when the message of the DVD has an insufficient storage space is displayed, the recording mode selected at that time is displayed on the display unit,
wherein the recording mode includes a switching mode and a non-switching mode,
in the switching mode, when it is determined that the video signals cannot be recorded on the videotape, the recording mode automatically switches to recording of the video signals on the DVD, on the other hand, when it is determined that the video signals cannot be recorded on the DVD, the recording mode automatically switches to recording of the video signals on the videotape, and
in the non-switching mode, when the video signals cannot be recorded on the corresponding recording medium, the recording stops.

2. A multifunctional recording and reproducing apparatus, comprising:
a first recording unit that records video signals on a first recording medium which can be ejected from a main body;

a second recording unit that records the video signals on a second recording medium which can be ejected from the main body;

a programmed recording control unit that accepts a setting for recording the video signals on the first recording medium and a setting for recording the video signals on the second recording medium, wherein the apparatus goes into a waiting state where a power supply of the multifunctional recording and reproducing apparatus is turned off after the programmed recording control unit finishes accepting the settings; and a display unit that is provided on a main body to display a message while the apparatus is in the waiting state where the power supply of the multifunctional recording and reproducing apparatus is turned off, wherein the first and second recording media are different types of recording media, and the message is displayed indicating whether a recording medium corresponding to an earliest recording is for the first type recording medium or the second type recording medium, such that the earliest recording is identified as a recording to be performed first from a plurality of programmed settings accepted by the programmed recording control unit.

3. The multifunctional recording and reproducing apparatus according to claim 2, wherein, when the recording medium corresponding to the earliest recording is not loaded at a predetermined position, a message indicating that the earliest recording cannot be performed is displayed on the display unit, when the recording medium corresponding to the earliest recording is loaded at the predetermined position, but a recording medium corresponding to another recording is not loaded at a predetermined position, a message indicating that the earliest recording cannot be performed is not displayed.

4. The multifunctional recording and reproducing apparatus according to claim 2, wherein, when a recording medium corresponding to the earliest recording is loaded at the predetermined position, but the video signals cannot be recorded on the recording medium, the message indicating that the programmed recording cannot be performed is displayed.

5. The multifunctional recording and reproducing apparatus according to claim 2, wherein, when a recording medium corresponding to the earliest recording is loaded at the predetermined position, and the recording medium does not have a storage space, the message indicating that the earliest recording cannot be performed is displayed.

6. The multifunctional recording and reproducing apparatus according to claim 2, wherein, when a recording medium corresponding to the earliest recording is loaded at the predetermined position and the video signals are to be recorded on the recording medium in accordance with a recording mode selected previously, if a recordable time on the recording medium is shorter than a time required to record the earliest recording, a message indicating that the recording medium has an insufficient storage space is displayed.

7. The multifunctional recording and reproducing apparatus according to claim 6, wherein, when the message that the recording medium has an insufficient storage space is displayed on the display unit, the recording mode selected at that time is displayed on the display unit.

\* \* \* \* \*